US012795003B1

(12) United States Patent
Hu

(10) Patent No.: US 12,795,003 B1
(45) Date of Patent: Nov. 10, 2026

(54) Q-SHAPED BRACKET STRUCTURE FOR MOBILE PHONE PROTECTIVE CASE AND MOBILE PHONE PROTECTIVE CASE

(71) Applicant: GOLBINBOX INC, Las Vegas, NV (US)

(72) Inventor: Yang Hu, Wuhu (CN)

(73) Assignee: GOLBINBOX INC, Las Vegas (CN)

( * ) Notice: Subject to any disclaimer, the term of this patent is extended or adjusted under 35 U.S.C. 154(b) by 0 days.

(21) Appl. No.: 19/657,178

(22) Filed: Apr. 24, 2026

(51) Int. Cl.
*H04M 1/02* (2006.01)
*H04M 1/04* (2006.01)

(52) U.S. Cl.
CPC ........... *H04M 1/0203* (2025.01); *H04M 1/04* (2013.01)

(58) Field of Classification Search
CPC .... H04M 1/04; H04M 1/0203; H04B 1/3888; H04B 1/3877
See application file for complete search history.

(56) References Cited

U.S. PATENT DOCUMENTS 11,658,694 B1 * 5/2023 Wang .................. H04B 1/3877 455/575.8
2023/0223976 A1 * 7/2023 Weng .................. H04B 1/3877 455/575.8
2023/0299807 A1 * 9/2023 Yang .................. H04B 1/3888 455/575.8
2025/0040688 A1 * 2/2025 Wang .................. A45C 11/00
2025/0183934 A1 * 6/2025 Wang .................. H04M 1/04
2026/0129111 A1 * 5/2026 Zhong ................ H04M 1/0203

FOREIGN PATENT DOCUMENTS

CN 120075347 A 5/2025
KR 20230021228 A 2/2023

* cited by examiner

*Primary Examiner* — Lester G Kincaid

(57) ABSTRACT

The present application discloses a Q-shaped bracket structure for a mobile phone protective case and a mobile phone protective case. By adopting a riveted connection between the base and the fixing frame, the connection reliability between the two is enhanced. In combination with the structure in which one end of the elastic piece is fixed to the fixing frame and the other end is rotatably connected to the rotating shaft, the bracket obtains a stable elastic driving force during unfolding and stowing, effectively avoiding friction and collision between the bracket and the base when the bracket is rotated to a specific angle. By providing the bottom surface of the base with an elastic piece receiving groove, a movement space of a predetermined distance is provided for the elastic piece when it moves toward the base, thereby preventing the elastic piece from contacting or colliding with the base during rotation of the bracket, satisfying the use requirement of the bracket flipping 180°, and avoiding damage to the bracket.

20 Claims, 5 Drawing Sheets

Q-SHAPED BRACKET STRUCTURE FOR MOBILE PHONE PROTECTIVE CASE AND MOBILE PHONE PROTECTIVE CASE

TECHNICAL FIELD

The present application relates to the technical field of electronic device accessories, and in particular to a Q-shaped bracket structure for a mobile phone protective case and a mobile phone protective case.

BACKGROUND

Bracket structures integrated on mobile phone protective cases (such as finger ring holders, foldable brackets, etc.) have been widely used to meet user needs such as watching videos, video calling, or desktop support. Among them, a possible type of bracket is the "Q-shaped bracket", which has an appearance similar to the letter "Q" and achieves unfolding and stowing of the bracket via a rotating shaft and a movable frame.

The Q-shaped bracket in the related art may include a base, a bracket, and a connecting assembly. However, in actual use, when the bracket is rotated to a specific angle, it is prone to friction and collision with the base, preventing the bracket from continuing to flip to 180°. If the bracket is further flipped by an external force at this time, it may easily cause damage to the bracket, affecting the service life.

SUMMARY

The present application provides a Q-shaped bracket structure for a mobile phone protective case and a mobile phone protective case, so as to solve the problems mentioned in the background art that when the bracket is rotated to a specific angle, it is prone to friction and collision with the base, preventing the bracket from continuing to flip to 180°, and if the bracket is further flipped by an external force at this time, it may easily cause damage to the bracket, affecting the service life.

In order to solve the above technical problems, in a first aspect, the present application provides a Q-shaped bracket structure for a mobile phone protective case, including: a base, a bracket, and a connecting assembly;

- wherein the connecting assembly includes a fixing frame, a movable frame, and a rotating shaft, the fixing frame is provided with an elastic piece, one end of the elastic piece is fixedly connected to the fixing frame, and the other end is rotatably connected to the rotating shaft, and the movable frame is fixedly or detachably connected to two ends of the rotating shaft;
- wherein the base is fixedly or rotatably mounted on the mobile phone protective case, the base is riveted to the fixing frame, a bottom surface of the base is provided with an elastic piece receiving groove for providing a movement space of a predetermined distance when the elastic piece moves toward the base, and the bracket is fixedly or detachably connected to the movable frame.

In one embodiment, the fixing frame includes a fixing frame main body, and a gap is provided between two sides of the elastic piece and the fixing frame main body.

In one embodiment, the elastic piece is integrally formed with the fixing frame at one end thereof.

In one embodiment, one end of the elastic piece is provided with a rotating shaft mounting portion, and the rotating shaft mounting portion is a C-shaped structure with one open end for receiving the rotating shaft of the predetermined diameter.

In one embodiment, an end of the elastic piece away from the rotating shaft mounting portion is provided with a protrusion for abutting against the bottom surface of the base when the elastic piece moves toward the bottom surface of the base to a predetermined position.

In one embodiment thereof, an end of the base adjacent to the rotating shaft mounting portion is provided with a notch, and a clearance of a predetermined distance is provided between an edge of the notch and an outer edge of the rotating shaft mounting portion.

In one embodiment thereof, the movable frame is provided with at least one figure-8 shaped mounting hole, the bracket is provided with a connecting protruding post matching the figure-8 shaped mounting hole, and the connecting protruding post is riveted within the figure-8 shaped mounting hole.

In one embodiment thereof, the bracket is provided with a movable frame mounting groove, and the movable frame is received within the movable frame mounting groove.

In one embodiment thereof, the Q-shaped bracket structure further includes a mounting seat, and the mounting seat is clamped between the fixing frame and the base.

In one embodiment thereof, the Q-shaped bracket structure further includes two elastic abutting assemblies, the base is symmetrically provided with elastic abutting assembly mounting notches, the mounting seat is provided with receiving grooves at positions corresponding to the elastic abutting assembly mounting notches, one end of each elastic abutting assembly is installed within the elastic abutting assembly mounting notch, and the other end abuts against the receiving groove.

In one embodiment thereof, the elastic abutting assembly includes a spring and an abutting member, one end of the spring is installed within the elastic abutting assembly mounting notch, and the other end is fixedly connected to the abutting member, and the abutting member always abuts against the receiving groove when the spring is in a compression deformation state.

In one embodiment thereof, the mounting seat has an annular structure.

In one embodiment thereof, the bracket is provided with a magnet unit therein for providing a magnetic attraction force.

In a second aspect, the present application further includes a mobile phone protective case, including:

- a housing;
- the Q-shaped bracket structure for a mobile phone protective case;
- wherein the housing is provided with a mounting seat receiving groove and a bracket receiving groove, the mounting seat receiving groove is arranged in communication with the bracket receiving groove, the mounting seat receiving groove is used for installing the base and the connecting assembly, and the bracket receiving groove is used for stowing the bracket when the bracket is stowed within the mobile phone protective case;
- wherein an inner layer of the mounting seat receiving groove is provided with an annular groove, the annular groove is used for installing the mounting seat, and the mounting seat can rotate 360° along the annular groove.

The beneficial effects of the above Q-shaped bracket structure for a mobile phone protective case and the mobile phone protective case are: by adopting a riveted connection between the base and the fixing frame, the connection reliability between the two is enhanced, and by combining the structure in which one end of the elastic piece is fixed to the fixing frame and the other end is rotatably connected to the rotating shaft, the bracket obtains a stable elastic driving force during unfolding and stowing, effectively avoiding friction and collision between the bracket and the base when the bracket is rotated to a specific angle; by providing the bottom surface of the base with an elastic piece receiving groove, a movement space of a predetermined distance is provided for the elastic piece when it moves toward the base, thereby preventing the elastic piece from contacting or colliding with the base during rotation of the bracket, satisfying the use requirement of the bracket flipping 180°, and avoiding damage to the bracket.

Figure 8:
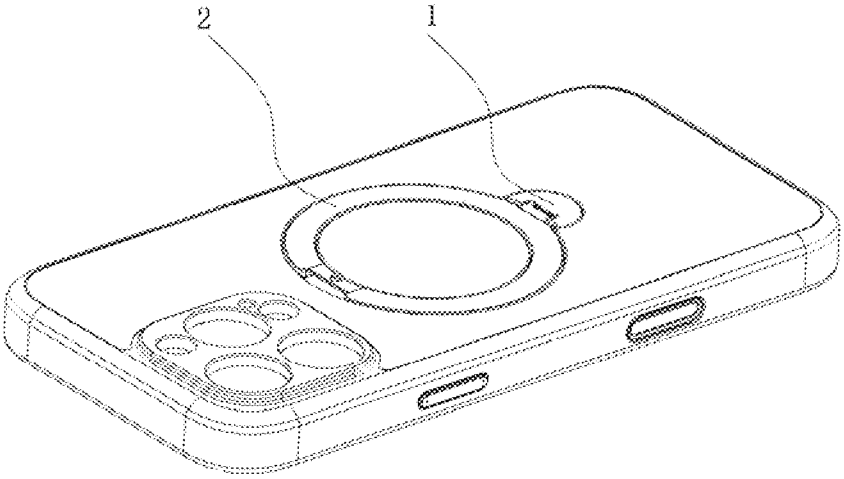
FIG. 8 is a schematic structural view of the mobile phone protective case according to another embodiment of the present application with the bracket in a stowed state.

In the drawings: base 1, elastic piece receiving groove 11, notch 12, elastic abutting assembly mounting notch 13, bracket 2, protruding post 21, movable frame mounting groove 22, magnet unit 23, connecting assembly 3, fixing frame 31, elastic piece 311, rotating shaft mounting portion 3111, protrusion 3112, fixing frame main body 312, movable frame 32, figure-8 shaped mounting hole 321, rotating shaft 33, mounting seat 4, receiving groove 41, elastic abutting assembly 5, spring 51, abutting member 52, housing 100*a*, mounting seat receiving groove 110*a*, annular groove 111*a*, bracket receiving groove 120*a*.

DETAILED DESCRIPTION OF EMBODIMENTS

In order to make the above objects, features, and advantages of the present disclosure more apparent and easier to understand, the detailed description of the specific embodiments of the present disclosure is provided below in conjunction with the accompanying drawings. In the following description, numerous specific details are set forth in order to provide a thorough understanding of the present disclosure. However, the present disclosure may be implemented in many other ways different from those described herein. Those skilled in the art may make similar modifications without departing from the spirit of the present disclosure, and therefore the present disclosure is not limited to the specific embodiments disclosed below.

It should be noted that when an element is referred to as being "fixed to" another element, it may be directly on the other element or there may be an intermediate element. When an element is referred to as being "connected" to another element, it may be directly connected to the other element or there may also be an intermediate element. In contrast, when an element is referred to as being "directly on" another element, no intermediate element is present. The terms "vertical," "horizontal," "left," "right," and similar expressions used herein are for illustrative purposes only.

Unless otherwise defined, all technical and scientific terms used herein have the same meanings as commonly understood by those skilled in the technical field of the present disclosure. The terms used in the description of the present disclosure are for the purpose of describing specific embodiments only and are not intended to limit the present disclosure. The term "and/or" used herein includes any and all combinations of one or more of the listed items.

Figure 1:
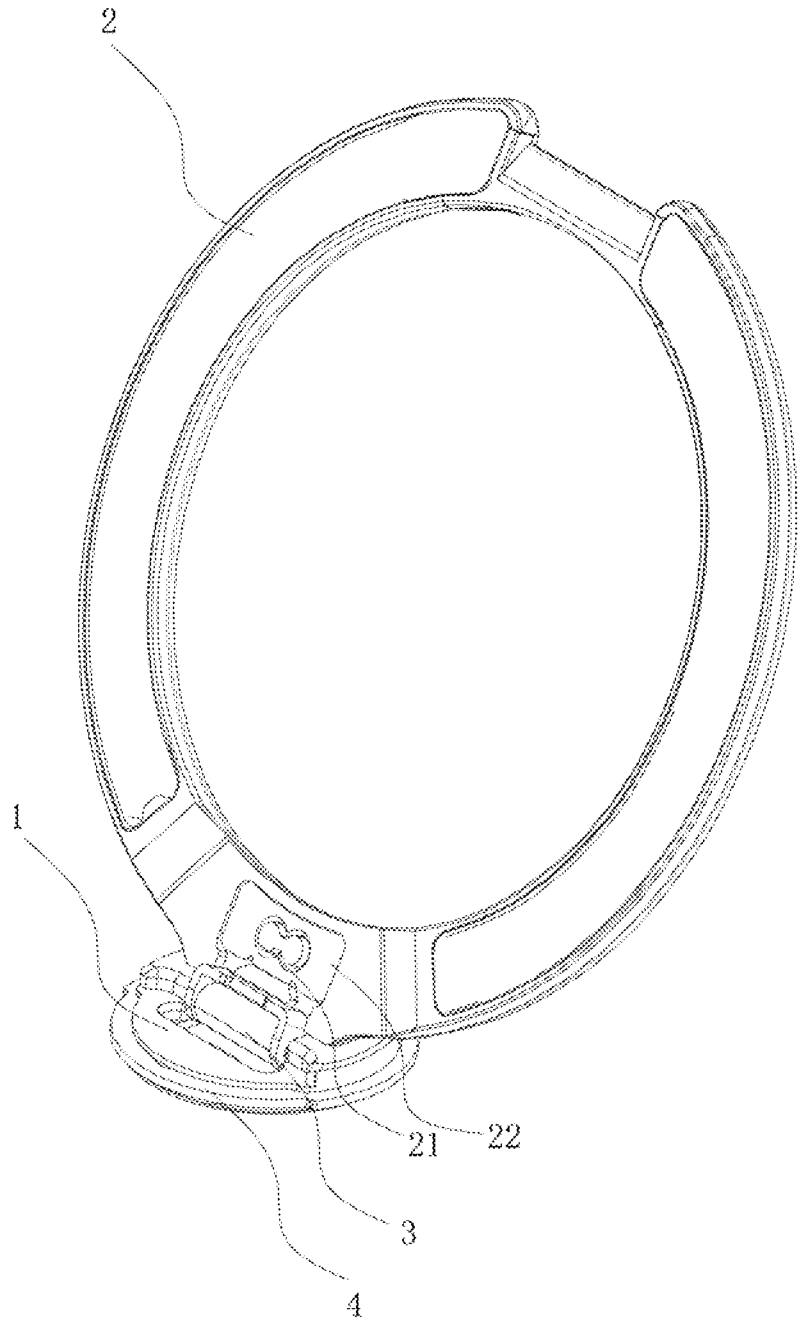
FIG. 1 is a schematic diagram of a Q-shaped bracket structure for a mobile phone protective case according to an embodiment of the present application.

As shown in FIG. 1, the present application provides a Q-shaped bracket structure for a mobile phone protective case, including: a base 1, a bracket 2, and a connecting assembly 3.

Figure 2:
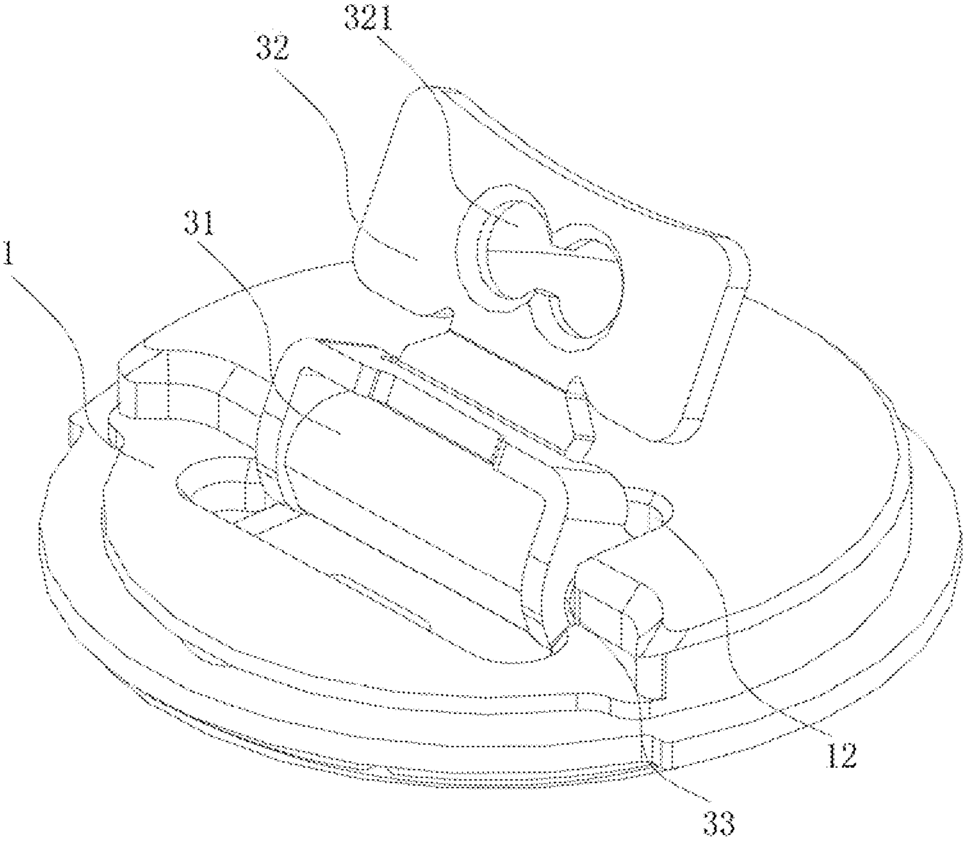
FIG. 2 is a schematic view of the assembly structure of the base and the connecting assembly of the Q-shaped bracket structure for a mobile phone protective case of FIG. 1 according to an embodiment of the present application.
Figure 3:
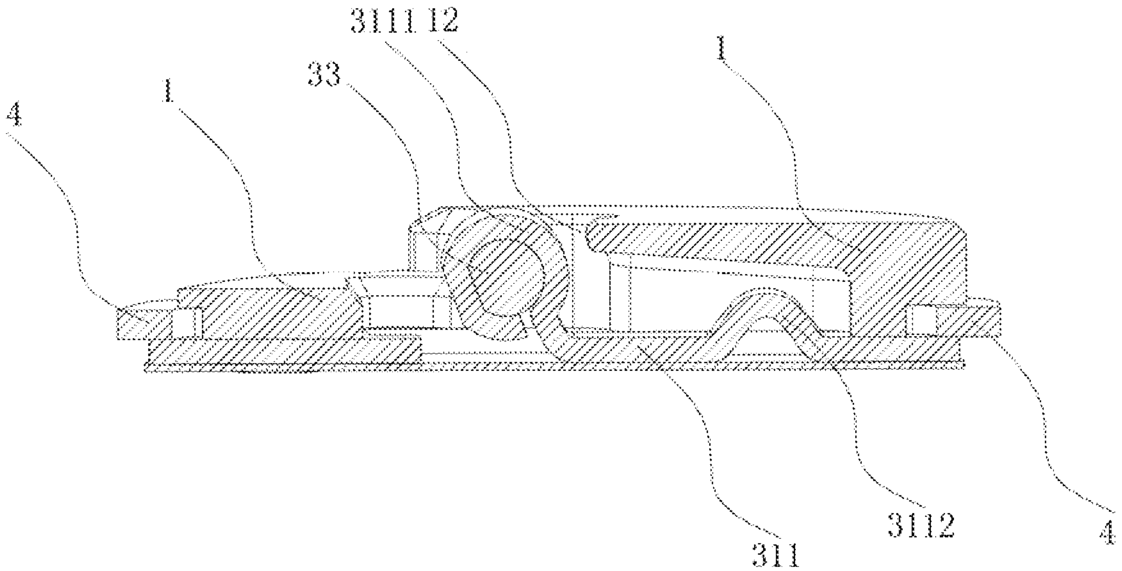
FIG. 3 is a schematic cross-sectional structural view of the base and the connecting assembly of the Q-shaped bracket structure for a mobile phone protective case of FIG. 1 according to an embodiment of the present application.

As shown in FIGS. 2 and 3, the connecting assembly 3 includes a fixing frame 31, a movable frame 32, and a rotating shaft 33, the fixing frame 31 is provided with an elastic piece 311, one end of the elastic piece 311 is fixedly connected to the fixing frame 31, and the other end is rotatably connected to the rotating shaft 33, and the movable frame 32 is fixedly or detachably connected to two ends of the rotating shaft 33.

The base 1 is fixedly or rotatably mounted on the mobile phone protective case, the base 1 is riveted to the fixing frame 31, a bottom surface of the base 1 is provided with an elastic piece receiving groove 11 for providing a movement space of a predetermined distance when the elastic piece 311 moves toward the base 1, and the bracket 2 is fixedly or detachably connected to the movable frame 32.

The base 1 is a component mounted on the mobile phone protective case.

The bracket 2 is a portion that a user directly pulls open or closes by hand, and it may be an annular or U-shaped structure.

The fixing frame 31 is fixedly connected to the base 1, for example, by riveting, and does not rotate by itself; the movable frame 32 is connected to the bracket 2 and rotates together with the bracket 2; the rotating shaft 33 is the shaft about which the movable frame 32 rotates.

The elastic piece 311 is an elastic arm. One end of the elastic piece 311 is integrally formed with the fixing frame 31.

By providing the elastic piece receiving groove 11 on the bottom surface of the base 1, a clearance space is provided for the elastic piece 311. When the bracket 2 rotates, the elastic piece 311 moves together with the rotating shaft 33 toward the base 1. During movement, the elastic piece 311 can be received in the elastic piece receiving groove 11 inside the base 1, obtaining sufficient movement space, effectively avoiding interference between the bracket 2 and the base 1 when the bracket 2 is flipped to a predetermined angle, and satisfying the requirement of the bracket 2 flipping 180°.

In the initial state, the base 1 is fixed on the mobile phone protective case, the fixing frame 31 is integrally connected to the base 1 by riveting, the bracket 2 is attached to the back of the phone case in a stowed state, and the elastic piece 311 is in a natural state.

When the user pulls the bracket 2 outward, the movable frame 32 drives the rotating shaft 33 to rotate, the elastic piece 311 is stretched, and during the movement of the elastic piece 311, at least a portion thereof enters the elastic piece receiving groove 11 on the bottom surface of the base 1 without hitting the base 1, effectively avoiding interference between the bracket 2 and the base 1 when the bracket 2 is flipped to a predetermined angle, and satisfying the requirement of the bracket 2 flipping 180°. At this time, the elastic piece 311 generates a restoring force, and when released at a certain angle, the damping provided by the rotating shaft 33 keeps the bracket 2 at that position. After the user pushes the bracket 2 back, the elastic piece 311 returns to the initial position, and the bracket 2 returns to the attached state.

Figure 4:
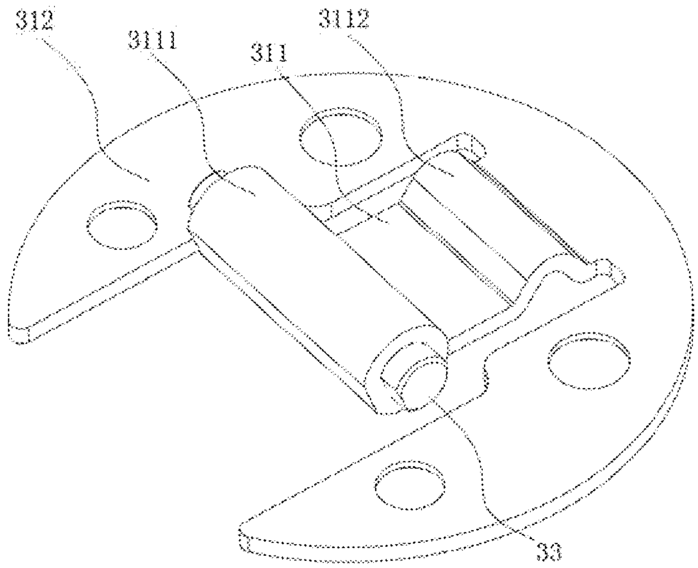
FIG. 4 is a schematic structural view of the fixing frame of the Q-shaped bracket structure for a mobile phone protective case of FIG. 1 according to an embodiment of the present application.

As shown in FIG. 4, in one embodiment thereof, the fixing frame 31 includes a fixing frame main body 312, and a gap is provided between two sides of the elastic piece 311 and the fixing frame main body 312.

Thus, the fixing frame main body 312 functions to "limit but not clamp", i.e., to limit excessive displacement of the elastic piece 311 without generating friction, effectively preventing friction or interference between the elastic piece 311 and the fixing frame main body 312 during rotation, thereby ensuring smooth opening and closing of the bracket 2, reducing noise and wear.

In one embodiment thereof, one end of the elastic piece 311 is provided with a rotating shaft mounting portion 3111, and the rotating shaft mounting portion 3111 is a C-shaped structure with one open end for receiving the rotating shaft 33 of the predetermined diameter.

Thus, the rotating shaft mounting portion 3111 is a C-shaped structure with one open end, giving the rotating shaft mounting portion 3111 a certain elasticity, which can effectively ensure that the rotating shaft 33 can rotate freely within the C-shaped groove and provide reliable axial constraint.

In one embodiment thereof, an end of the elastic piece 311 away from the rotating shaft mounting portion 3111 is provided with a protrusion 3112 for abutting against the bottom surface of the base 1 when the elastic piece 311 moves toward the bottom surface of the base 1 to a predetermined position.

Thus, the end of the elastic piece 311 away from the rotating shaft mounting portion 3111 is provided with a protrusion 3112. When the bracket 2 is opened to a predetermined maximum angle, for example, 180°, the elastic piece 311 moves toward the bottom surface of the base 1 so that the protrusion 3112 abuts against the bottom surface of the base 1, thereby forming a mechanical stop structure, preventing the elastic piece 311 from being excessively twisted, protecting the elastic piece 311 from permanent deformation or fracture, and also limiting the maximum opening angle of the bracket 2, thereby improving the reliability and service life of the product.

In one embodiment thereof, an end of the base 1 adjacent to the rotating shaft mounting portion 3111 is provided with a notch 12, and a clearance of a predetermined distance is provided between an edge of the notch 12 and an outer edge of the rotating shaft mounting portion 3111.

This design ensures that the C-shaped rotating shaft mounting portion 3111 never contacts the edge of the base 1 during torsional deformation or movement of the elastic piece 311, thereby avoiding interference, friction, and abnormal noise, while providing sufficient movement space for the rotating shaft mounting portion 3111, ensuring smooth opening and closing of the bracket 2, and also facilitating assembly operations.

As shown in FIG. 1, in one embodiment thereof, the movable frame 32 is provided with at least one figure-8 shaped mounting hole 321, the bracket 2 is provided with a connecting protruding post 21 matching the figure-8 shaped mounting hole 321, and the connecting protruding post 21 is riveted within the figure-8 shaped mounting hole 321.

Thus, the movable frame 32 is provided with at least one figure-8 shaped mounting hole 321, and the bracket 2 is provided with a figure-8 shaped connecting protruding post 21 matching the shape of the hole, and the protruding post 21 is fixed within the hole by riveting. The figure-8 shaped cross-section itself has an anti-rotation function. After riveting, it not only ensures axial fixation between the movable frame 32 and the bracket 2, but also prevents relative rotation therebetween, thereby achieving a reliable, stable, and low-cost connection without adding any additional parts.

In one embodiment thereof, the bracket 2 is provided with a movable frame mounting groove 22, and the movable frame 32 is received within the movable frame mounting groove 22.

Thus, the bracket 2 is provided with a movable frame mounting groove 22 matching the shape of the movable frame 32, and the movable frame 32 is received and embedded in the movable frame mounting groove 22. Without increasing the overall thickness, precise positioning and stable connection between the movable frame 32 and the bracket 2 are achieved, while the movable frame 32 is not exposed or protruding, thereby obtaining a thinner product profile, a tidier appearance, and better structural protection.

In one embodiment thereof, the Q-shaped bracket structure further includes a mounting seat 4, and the mounting seat 4 is clamped between the fixing frame 31 and the base 1.

Thus, the Q-shaped bracket structure further includes a mounting seat 4, which is sandwiched between the fixing frame 31 and the base 1 and fixed by the compressive force generated during riveting. When the mounting seat 4 rotates within the mobile phone protective case, it can drive the base 1, the bracket 2, and the connecting assembly 3 to rotate synchronously together.

Figure 5:
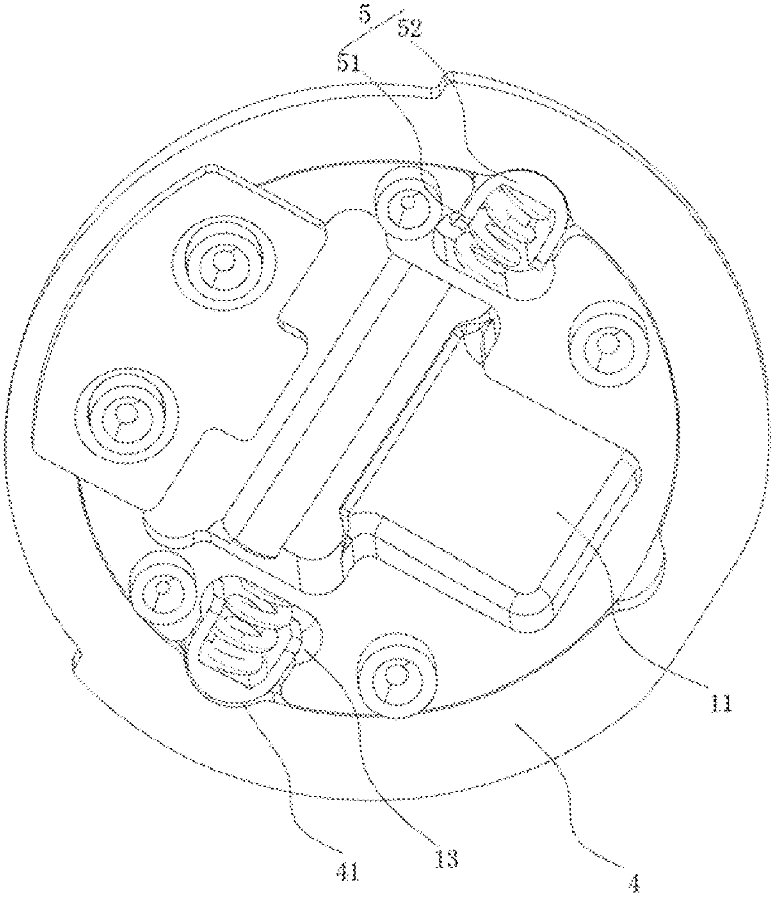
FIG. 5 is a schematic view of the assembly structure of the elastic abutting assembly of the Q-shaped bracket structure for a mobile phone protective case of FIG. 1 according to an embodiment of the present application.

As shown in FIG. 5, in one embodiment thereof, the Q-shaped bracket structure further includes two elastic abutting assemblies 5, the base 1 is symmetrically provided with elastic abutting assembly mounting notches 13, the mounting seat 4 is provided with receiving grooves 41 at positions corresponding to the elastic abutting assembly mounting notches 13, one end of each elastic abutting assembly 5 is installed within the elastic abutting assembly mounting notch 13, and the other end abuts against the receiving groove 41.

The elastic abutting assembly 5 includes a spring 51 and an abutting member 52, one end of the spring 51 is installed within the elastic abutting assembly mounting notch 13, and the other end is fixedly connected to the abutting member 52, and the abutting member 52 always abuts against the receiving groove 41 when the spring 51 is in a compression deformation state. The mounting seat 4 has an annular structure.

Thus, during installation, the spring 51 is always in a compression deformation state, pressing the abutting member 52 into the receiving groove 41 of the mounting seat 4, constantly applying a preload, eliminating clearance, and achieving a better fixed connection between the mounting seat 4 and the base 1. Because there are two elastic abutting assemblies 5, the connection between the mounting seat 4 and the base 1 is more stable.

Figure 6:
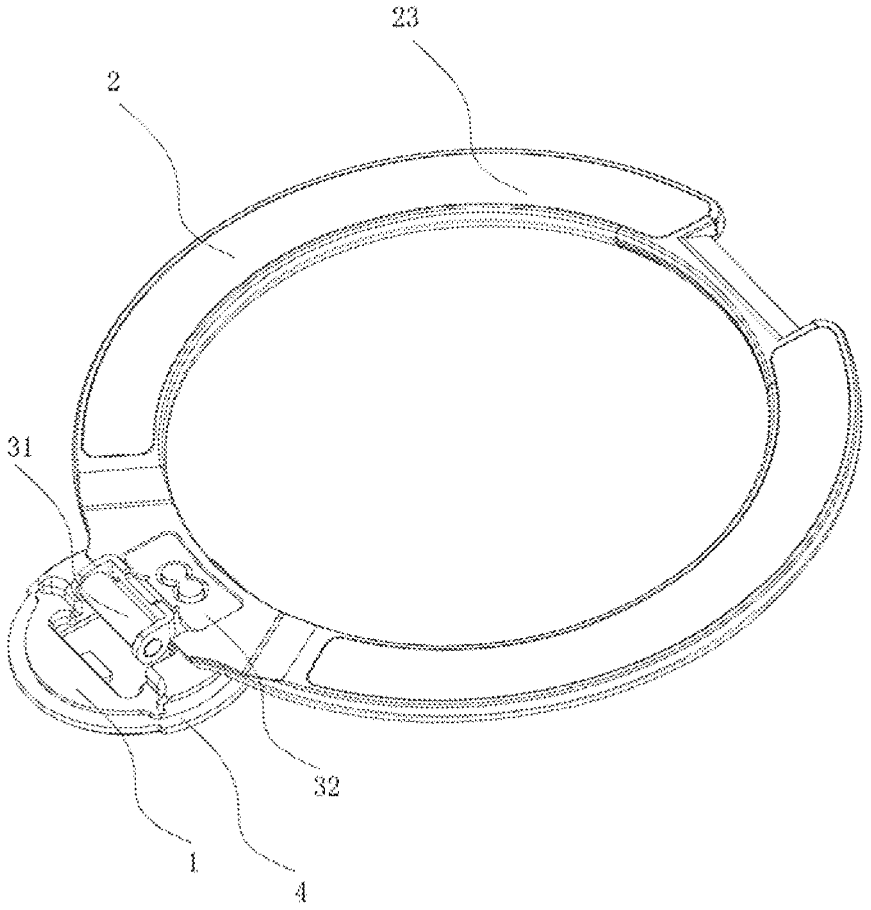
FIG. 6 is a schematic structural view of the bracket of the Q-shaped bracket structure for a mobile phone protective case of FIG. 1 flipped by 180° according to an embodiment of the present application.

As shown in FIG. 6, in one embodiment thereof, the bracket 2 is provided with a magnet unit 23 therein for providing a magnetic attraction force.

Thus, by providing the magnet unit 23, a magnetic attraction force can be generated when a mobile phone is placed on the bracket 2, making the mobile phone more stable in placement.

Figure 7:
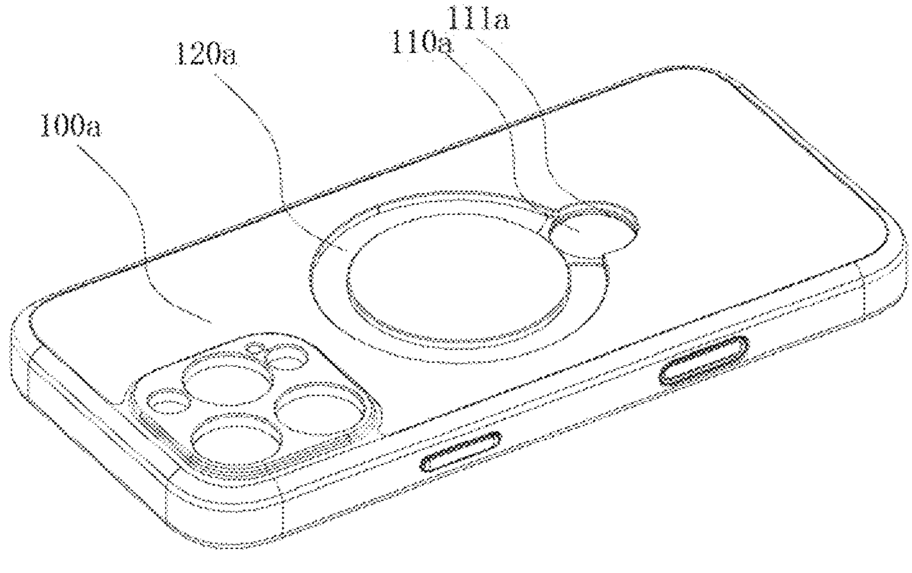
FIG. 7 is a schematic structural view of a mobile phone protective case according to another embodiment of the present application.
Figure 9:
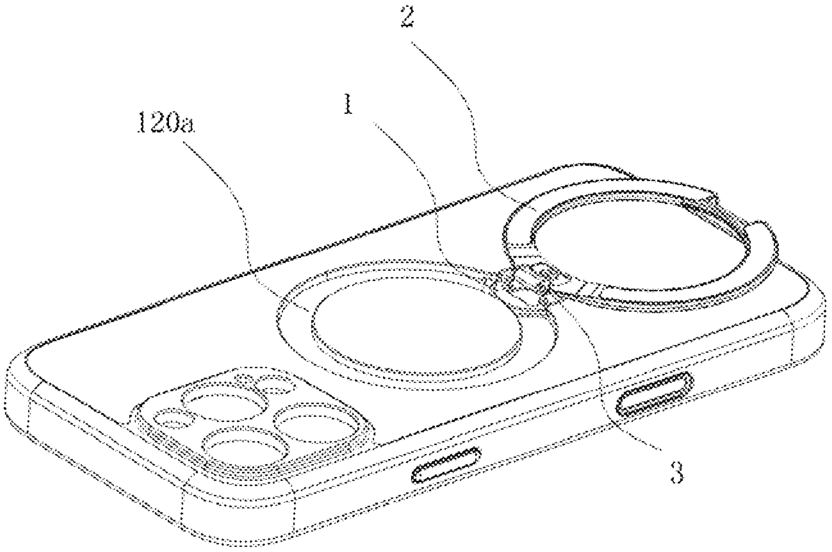
FIG. 9 is a schematic structural view of the mobile phone protective case according to another embodiment of the present application with the bracket in a 180° flipped state.

As shown in FIGS. 7, 8, and 9, in a second aspect, the present application further includes a mobile phone protective case, including:

a housing 100*a;* the Q-shaped bracket structure for a mobile phone protective case;

wherein the housing 100*a* is provided with a mounting seat receiving groove 110*a* and a bracket receiving groove 120*a*, the mounting seat receiving groove 110*a* is arranged in communication with the bracket receiving groove 120*a*, the mounting seat receiving groove 110*a* is used for installing the base 1 and the connecting assembly 3, and the bracket receiving groove 120*a* is used for stowing the bracket 2 when the bracket 2 is stowed within the mobile phone protective case;

wherein an inner layer of the mounting seat receiving groove 110*a* is provided with an annular groove 111*a*, the annular groove 111*a* is used for installing the mounting seat 4, and the mounting seat 4 can rotate 360° along the annular groove 111*a*.

Thus, the mounting seat 4 is an annular sheet-like structure, with an edge that can be embedded in the annular groove 111*a*. The mounting seat 4 can freely rotate 360° within the annular groove 111*a*, allowing the entire Q-shaped bracket structure to rotate to any angle relative to the phone case as a whole, so that the user can adjust the supporting direction of the bracket 2 at any time as needed (e.g., landscape orientation or portrait orientation), greatly improving the flexibility of use and scene adaptability of the mobile phone protective case bracket.

The technical features described in the above embodiments may be arbitrarily combined. For the sake of conciseness, all possible combinations of the technical features in the above embodiments are not described. However, any combination of these technical features that does not involve contradiction shall be considered to fall within the scope of this description.

The above-described embodiments only represent several implementations of the present disclosure, and the description is relatively specific and detailed, but should not be construed as limiting the scope of the patent. It should be noted that for those skilled in the art, various modifications and improvements can be made without departing from the concept of the present disclosure, and all such modifications and improvements shall fall within the protection scope of the present disclosure. Therefore, the protection scope of the present disclosure shall be determined by the appended claims.

What is claimed is:

1. A Q-shaped bracket structure for a mobile phone protective case, comprising a base, a bracket, and a connecting assembly;

wherein the connecting assembly comprises a fixing frame, a movable frame, and a rotating shaft; wherein the fixing frame comprises an elastic piece, wherein one end of the elastic piece is fixedly connected to the fixing frame, and another end of the elastic piece is rotatably connected to the rotating shaft, wherein the movable frame is fixedly or detachably connected to two ends of the rotating shaft;

wherein the base is fixedly or rotatably mounted on the mobile phone protective case, wherein the base is riveted to the fixing frame, wherein a bottom surface of the base defines an elastic piece receiving groove for providing a movement space of a predetermined distance when the elastic piece moves toward the base, and wherein the bracket is fixedly or detachably connected to the movable frame.

2. The Q-shaped bracket structure for a mobile phone protective case according to claim 1, wherein the fixing frame comprises a fixing frame main body, and wherein there is defined a gap that extends from each of two sides of the elastic piece to the fixing frame main body.

3. The Q-shaped bracket structure for a mobile phone protective case according to claim 2, wherein one end of the elastic piece comprises a rotating shaft mounting portion, wherein the rotating shaft mounting portion is a C-shaped structure with one open end for receiving the rotating shaft having a predetermined diameter.

4. The Q-shaped bracket structure for a mobile phone protective case according to claim 3, wherein an end of the elastic piece facing away from the rotating shaft mounting portion comprises a protrusion configured for abutting against the bottom surface of the base when the elastic piece moves toward the bottom surface of the base to a predetermined position.

5. The Q-shaped bracket structure for a mobile phone protective case according to claim 4, wherein an end of the base adjacent to the rotating shaft mounting portion defines a notch, and wherein a clearance of a predetermined distance is defined between an edge of the notch and an outer edge of the rotating shaft mounting portion.

6. The Q-shaped bracket structure for a mobile phone protective case according to claim 5, wherein the movable frame defines at least one figure-8 shaped mounting hole, the bracket comprising a connecting protruding post matching the figure-8 shaped mounting hole, wherein the connecting protruding post is riveted within the figure-8 shaped mounting hole.

7. The Q-shaped bracket structure for a mobile phone protective case according to claim 1, wherein the Q-shaped bracket structure further comprises a mounting seat, and the mounting seat is clamped between the fixing frame and the base.

8. The Q-shaped bracket structure for a mobile phone protective case according to claim 7, wherein the Q-shaped bracket structure further comprises two elastic abutting assemblies, the base symmetrically defines two elastic abutting assembly mounting notches, the mounting seat defines receiving grooves at positions corresponding to the elastic abutting assembly mounting notches, wherein one end of each elastic abutting assembly is installed within the elastic abutting assembly mounting notch, and another end of the elastic abutting assembly abuts against the receiving groove.

9. The Q-shaped bracket structure for a mobile phone protective case according to claim 8, wherein the elastic abutting assembly comprises a spring and an abutting member, one end of the spring is installed within the elastic abutting assembly mounting notch, and another end of the spring is fixedly connected to the abutting member, and the abutting member always abuts against the receiving groove when the spring is in a compression deformation state.

10. The Q-shaped bracket structure for a mobile phone protective case according to claim 9, wherein the mounting seat has an annular structure.

11. The Q-shaped bracket structure for a mobile phone protective case according to claim 10, wherein the bracket comprises a magnet unit disposed therein for providing a magnetic attraction force.

12. A mobile phone protective case, comprising:

a housing;

a Q-shaped bracket structure for the mobile phone protective case, the Q-shaped bracket structure comprising a base, a bracket, and a connecting assembly; wherein the connecting assembly comprises a fixing frame, a movable frame, and a rotating shaft; wherein the fixing frame comprises an elastic piece, wherein one end of the elastic piece is fixedly connected to the fixing frame, and another end of the elastic piece is rotatably connected to the rotating shaft, wherein the movable frame is fixedly or detachably connected to two ends of the rotating shaft; wherein the base is fixedly or rotatably mounted on the mobile phone protective case, wherein the base is riveted to the fixing frame, wherein a bottom surface of the base defines an elastic piece receiving groove for providing a movement space of a predetermined distance when the elastic piece moves toward the base, and wherein the bracket is fixedly or detachably connected to the movable frame;

wherein the housing defines a mounting seat receiving groove and a bracket receiving groove, the mounting seat receiving groove is arranged in communication with the bracket receiving groove, the mounting seat receiving groove is configured for installing the base and the connecting assembly, and the bracket receiving groove is configured for stowing the bracket when the bracket is stowed within the mobile phone protective case;

wherein an inner layer of the mounting seat receiving groove is provided with an annular groove, the annular groove is configured for installing the mounting seat, and the mounting seat is operative to rotate 360° along the annular groove.

13. The mobile phone protective case according to claim 12, wherein the fixing frame comprises a fixing frame main body, and wherein there is defined a gap that extends from each of two sides of the elastic piece to the fixing frame main body.

14. The mobile phone protective case according to claim 13, wherein one end of the elastic piece comprises a rotating shaft mounting portion, wherein the rotating shaft mounting portion is a C-shaped structure with one open end for receiving the rotating shaft having a predetermined diameter.

15. The mobile phone protective case according to claim 14, wherein an end of the elastic piece facing away from the rotating shaft mounting portion comprises a protrusion configured for abutting against the bottom surface of the base when the elastic piece moves toward the bottom surface of the base to a predetermined position.

16. The mobile phone protective case according to claim 15, wherein an end of the base adjacent to the rotating shaft mounting portion defines a notch, and wherein a clearance of a predetermined distance is defined between an edge of the notch and an outer edge of the rotating shaft mounting portion.

17. The mobile phone protective case according to claim 16, wherein the movable frame defines at least one figure-8 shaped mounting hole, the bracket comprising a connecting protruding post matching the figure-8 shaped mounting hole, wherein the connecting protruding post is riveted within the figure-8 shaped mounting hole.

18. The mobile phone protective case according to claim 12, wherein the Q-shaped bracket structure further comprises a mounting seat, and the mounting seat is clamped between the fixing frame and the base.

19. The mobile phone protective case according to claim 18, wherein the Q-shaped bracket structure further comprises two elastic abutting assemblies, the base symmetrically defines two elastic abutting assembly mounting notches, the mounting seat defines receiving grooves at positions corresponding to the elastic abutting assembly mounting notches, wherein one end of each elastic abutting assembly is installed within the elastic abutting assembly mounting notch, and another end of the elastic abutting assembly abuts against the receiving groove.

20. The mobile phone protective case according to claim 19, wherein the elastic abutting assembly comprises a spring and an abutting member, one end of the spring is installed within the elastic abutting assembly mounting notch, and another end of the spring is fixedly connected to the abutting member, and the abutting member always abuts against the receiving groove when the spring is in a compression deformation state.

* * * * *